United States Patent
Humphreys et al.

(10) Patent No.: US 10,701,011 B2
(45) Date of Patent: *Jun. 30, 2020

(54) RE-ROUTING INCOMING EMAIL FOR A MULTI-TENANT DATABASE SYSTEM

(71) Applicant: salesforce.com, inc., San Francisco, CA (US)

(72) Inventors: Joseph Humphreys, Tierra Verde, FL (US); Rasmus Mencke, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/961,470

(22) Filed: Apr. 24, 2018

(65) Prior Publication Data
US 2018/0241709 A1   Aug. 23, 2018

Related U.S. Application Data

(63) Continuation of application No. 14/988,906, filed on Jan. 6, 2016, now Pat. No. 9,992,144, which is a continuation of application No. 13/897,157, filed on May 17, 2013, now Pat. No. 9,264,388.

(60) Provisional application No. 61/648,720, filed on May 18, 2012.

(51) Int. Cl.
*H04L 12/58*   (2006.01)

(52) U.S. Cl.
CPC .................................. *H04L 51/14* (2013.01)

(58) Field of Classification Search
CPC ........................................................ H04L 51/14
USPC .................................................. 709/206, 207
See application file for complete search history.

(56) References Cited

U.S. PATENT DOCUMENTS

| | | | |
|---|---|---|---|
| 2003/0074408 A1* | 4/2003 | Clark | H04L 51/28 709/206 |
| 2006/0174033 A1* | 8/2006 | Gillum | H04L 51/14 709/238 |

* cited by examiner

*Primary Examiner* — Jason D Recek
(74) *Attorney, Agent, or Firm* — LKGlobal | Lorenz & Kopf, LLP

(57) ABSTRACT

A method for processing email for a database system is presented here. The system includes a plurality of data centers and a plurality of instances of a database system core. Each data center implements at least one instance of the database core. The method receives an incoming email at a first local mail transfer agent (MTA) of a first data center, where the incoming email is erroneously directed to a first instance of the database system core. The method continues by searching a private domain name service (DNS) database maintained at the first data center, based on an identifier of the first instance and an identifier of the first data center. The method then obtains an identifier associated with a second data center of the plurality of data centers, and routes the incoming email in accordance with the identifier of the second data center.

8 Claims, 5 Drawing Sheets

RE-ROUTING INCOMING EMAIL FOR A MULTI-TENANT DATABASE SYSTEM

CROSS-REFERENCE TO RELATED APPLICATIONS

This application is a continuation of U.S. patent application Ser. No. 14/988,906 (filed Jan. 6, 2016), which is a continuation of U.S. patent application Ser. No. 13/897,157 (filed May 17, 2013), which claims the benefit of U.S. Provisional Patent Application No. 61/648,720 (filed May 18, 2012).

TECHNICAL FIELD

Embodiments of the subject matter described herein relate generally to email systems. More particularly, embodiments of the subject matter relate to the re-routing of incoming email that is destined for a multi-tenant database system.

BACKGROUND

The prior art is replete with a variety of different computer-based email systems and related email delivery, processing, and presentation techniques. A typical email system employs a mail server or mail transfer agent (MTA) that receives email messages directed to a particular domain and routes the incoming email as needed to the intended recipient. A multi-tenant database system may also support email features and functionality for a plurality of different tenants (a "tenant" may also be referred to herein as an "organization"). The multi-tenant environment, however, can present certain challenges and difficulties that relate to the routing and re-routing of incoming email. For example, the entity that hosts or maintains a distributed database system (such as a multi-tenant database system) may have to deal with load balancing or scalability issues that require the addition of new servers, data centers, instances, and/or pods to an existing infrastructure. In such a scenario, it may be necessary to logically move an organization that had been implemented and supported by one instance of the multi-tenant database system "core" residing at a first data center to a different instance of the system core residing at a second data center. Such movement can result in a service interruption or other inconvenience for those trying to access their stored data. Moreover, such movement can also affect the transmission of incoming emails to servers, data centers, instances, and/or pods that are in a migration process. These issues are exacerbated in organizations that manage a significant volume of emails.

In certain situations, an MTA can be employed to direct or re-direct email traffic. In other situations, however, an MTA cannot be effectively utilized to re-route email traffic. For example, if a multi-tenant database system includes multiple instances of its system core distributed across a plurality of different data centers, and if the MTA has no internal knowledge of the instances that reside in a data center, then the MTA can only use domain name system (DNS) data to direct the email. As such, DNS data must be the same in every datacenter for such implementations, and an MTA in one data center cannot deliver email directly to an instance of the system core located in another data center.

Accordingly, it is desirable to have an efficient and effective methodology for re-routing an inbound email initially transmitted to one server, data center, or system core instance, particularly in the context of a multi-tenant database system. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented here relate to computer-implemented techniques and methodologies for the handling and processing of email messages. More specifically, the subject matter described here includes a methodology for re-routing an inbound email that is initially transmitted to one server, data center, instance, and/or pod by diverting its path midstream so that the incoming email is properly received at a different server, data center, instance, and/or pod. Certain embodiments leverage DNS techniques to manage the re-routing of incoming email after data center and/or pod migrations.

Figure 1:
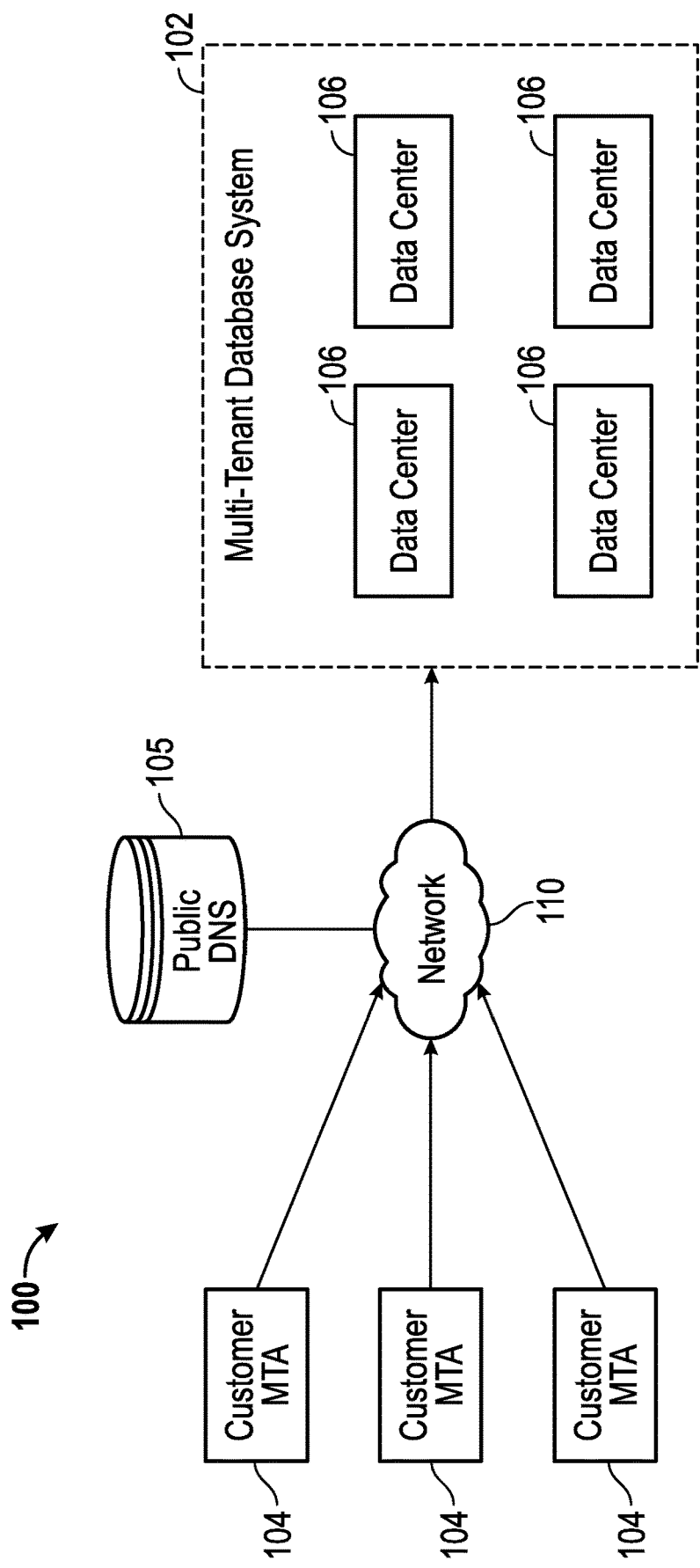
FIG. 1 is a schematic representation of an exemplary embodiment of a network-based system that handles email directed to a multi-tenant database system.

Referring now to the drawings, FIG. 1 is a representation of an exemplary embodiment of a network-based system 100 that handles email directed to a multi-tenant database system 102. The system 100 supports the delivery and processing of incoming email messages that originate or are otherwise provided by a sending email server or MTA, wherein the incoming email messages are destined for any of the tenants supported by the multi-tenant database system 102. The illustrated embodiment assumes that each incoming email message is provided by an associated customer MTA 104 (i.e., an email server) that is maintained by an entity, service, or system associated with the sender of the email message. Although FIG. 1 shows only three customer MTAs 104, the system may support any number of customer MTAs 104 to accommodate incoming email from a variety of sources. Although not depicted in FIG. 1, incoming email messages are received by at least one MTA of the multi-tenant database system 102 for processing, routing, and delivery to the intended recipients (see FIG. 3, which shows MTAs resident at two data centers of a multi-tenant database system). In accordance with established email technology, the customer MTAs 104 may cooperate with a public DNS database 105 having DNS entries that allow the customer MTAs 104 to route their outgoing email to the appropriate destinations (network addresses). The public DNS database 105 and the associated operating techniques are conventional and, therefore, will not be described in detail here.

The system 100 is focused around the multi-tenant database system 102, which may be implemented as one or more computer-based server devices. For simplicity and ease of description, FIG. 1 depicts the multi-tenant database system 102 as a single block or component. In practice, however, the multi-tenant database system 102 can be deployed as a distributed architecture having any number of data centers 106. Although FIG. 1 depicts only four data centers 106, an embodiment of the multi-tenant database system 102 may include more or less than four, and certain embodiments may only have one data center 106. It should be appreciated that one physical location (e.g., a building, an office suite, or a business campus) may include only one data center 106, or it may include a plurality of logically distinct and separate data centers 106.

Each data center 106 is suitably configured to implement and support at least one instance or pod of the system core of the multi-tenant database system 102. In the context of this description "instance" may be used interchangeably with "pod" to refer to an independent and fully operational instantiation of the system core. In this regard, the multi-tenant database system 102 could employ any number of redundant or backup instances for failsafe operation. Moreover, the system 102 preferably utilizes a plurality of non-redundant instances to service a plurality of different tenants or organizations. As one non-limiting example, one data center 106 may include four non-redundant instances, and each instance may be configured to support any number of different tenants or organizations. In accordance with the exemplary embodiments presented here, each organization is normally supported by only one instance at any given time. Conceptually, therefore, each organization supported by the multi-tenant database system 102 is "located" in one and only one instance, which in turn is "located" in one and only one data center 106.

The system 100 may include or support any number of client devices operating in association with any number of tenants. In practice, each tenant supported by the multi-tenant database system 102 will typically have a plurality of distinct client devices associated therewith. For example, a first tenant may support thousands of users via a like number of physically distinct client devices, and a second tenant may support only ten different users that share five client devices. For simplicity, the client devices are not shown in FIG. 1. Of course, the system 100 may be arranged in any suitable configuration as needed to support the desired number of tenants and the desired number of client devices.

The customer MTAs 104, the multi-tenant database system 102, and the data centers 106 may communicate with a suitably arranged data communication network 110. In practice, the data communication network 110 may be any digital or other communications network capable of transmitting messages or data between devices, systems, or components. Although not explicitly shown in FIG. 1, the data centers 106 may communicate with each other via the data communication network 110. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

The system 100 is preferably realized as a computer-implemented system in that the customer MTAs 104, the public DNS database 105, and the multi-tenant database system 102 are configured and implemented using computer-based electronic devices. In this regard, the system 100 may include any number of components, each realized as a computer-implemented or computer-based device having the hardware, software, firmware, and/or processing logic needed to carry out the various techniques and methodologies described in more detail herein. For example, a single data center 106 may include a plurality of server devices configured to support the different instances of the multi-tenant database system core.

The exemplary embodiments presented here relate to various computer-implemented and computer-executed techniques related to email systems and techniques for processing and re-routing incoming email messages that are intended for a user of a distributed system. The described subject matter could be implemented in connection with any suitable computer-based architecture, system, network, or environment, such as two or more user devices that communicate via a data communication network. Although the subject matter presented here could be utilized in connection with any type of computing environment, certain exemplary embodiments can be implemented in conjunction with a multi-tenant database system, such as the system 102 shown in FIG. 1.

Figure 2:
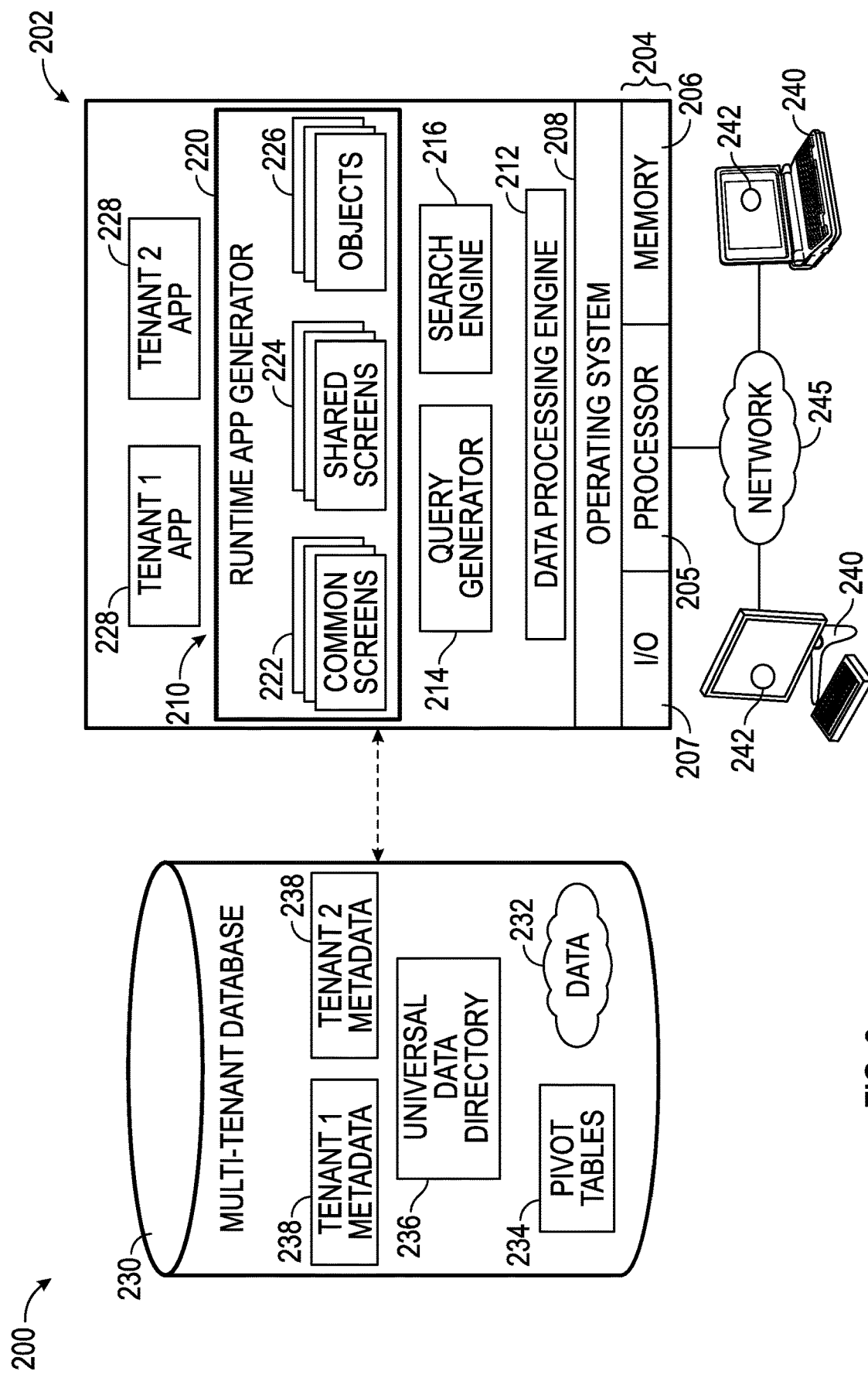
FIG. 2 is a schematic representation of an exemplary embodiment of a multi-tenant database system.

In this regard, an exemplary embodiment of a multi-tenant database system 200 is shown in FIG. 2. The system 200 suitably includes a server 202 that dynamically creates virtual applications 228 based upon data 232 from a common database 230 that is shared between multiple tenants. Data and services generated by the virtual applications 228 are provided via a network 245 to any number of user devices 240, as desired. Each virtual application 228 is suitably generated at run-time using a common application platform 210 that securely provides access to the data 232 in the database 230 for each of the various tenants subscribing to the system 200. In accordance with one non-limiting example, the system 200 may be implemented in the form of a multi-tenant customer relationship management system that can support any number of authenticated users of multiple tenants.

A "tenant" or an "organization" generally refers to a group of users that shares access to common data within the database 230. Tenants may represent customers, customer departments, business or legal organizations, and/or any other entities that maintain data for particular sets of users within the system 200. Although multiple tenants may share access to the server 202 and the database 230, the particular data and services provided from the server 202 to each tenant can be securely isolated from those provided to other tenants. The multi-tenant architecture therefore allows different sets of users to share functionality without necessarily sharing any of the data 232.

The database 230 is any sort of repository or other data storage system capable of storing and managing the data 232 associated with any number of tenants. The database 230 may be implemented using any type of conventional database server hardware. In various embodiments, the database 230 shares processing hardware 204 with the server 202. In other embodiments, the database 230 is implemented using separate physical and/or virtual database server hardware that communicates with the server 202 to perform the various functions described herein.

The data 232 may be organized and formatted in any manner to support the application platform 210. In various embodiments, the data 232 is suitably organized into a relatively small number of large data tables to maintain a semi-amorphous "heap"-type format. The data 232 can then be organized as needed for a particular virtual application 228. In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238 for each tenant, as desired. Rather than forcing the data 232 into an inflexible global structure that is common to all tenants and applications, the database 230 is organized to be relatively amorphous, with the pivot tables 234 and the metadata 238 providing additional structure on an as-needed basis. To that end, the application platform 210 suitably uses the pivot tables 234 and/or the metadata 238 to generate "virtual" components of the virtual applications 228 to logically obtain, process, and present the relatively amorphous data 232 from the database 230.

The server 202 is implemented using one or more actual and/or virtual computing systems that collectively provide the dynamic application platform 210 for generating the virtual applications 228. The server 202 operates with any sort of conventional processing hardware 204, such as a processor 205, memory 206, input/output features 207 and the like. The processor 205 may be implemented using one or more of microprocessors, microcontrollers, processing cores and/or other computing resources spread across any number of distributed or integrated systems, including any number of "cloud-based" or other virtual systems. The memory 206 represents any non-transitory short or long term storage capable of storing programming instructions for execution on the processor 205, including any sort of random access memory (RAM), read only memory (ROM), flash memory, magnetic or optical mass storage, and/or the like. The server 202 typically includes or cooperates with some type of computer-readable media, where a tangible computer-readable medium has computer-executable instructions stored thereon. The computer-executable instructions, when read and executed by the server 202, cause the server 202 to perform certain tasks, operations, functions, and processes described in more detail herein. In this regard, the memory 206 may represent one suitable implementation of such computer-readable media. Notably, the processor 205 and the memory 206 may be suitably configured to carry out the various email processing and related features described herein.

The input/output features 207 represent conventional interfaces to networks (e.g., to the network 245, or any other local area, wide area or other network), mass storage, display devices, data entry devices and the like. In a typical embodiment, the application platform 210 gains access to processing resources, communications interfaces and other features of the processing hardware 204 using any sort of conventional or proprietary operating system 208. As noted above, the server 202 may be implemented using a cluster of actual and/or virtual servers operating in conjunction with each other, typically in association with conventional network communications, cluster management, load balancing and other features as appropriate.

The application platform 210 is any sort of software application or other data processing engine that generates the virtual applications 228 that provide data and/or services to the user devices 240. The virtual applications 228 are typically generated at run-time in response to queries received from the user devices 240. For the illustrated embodiment, the application platform 210 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

The runtime application generator 220 dynamically builds and executes the virtual applications 228 in response to specific requests received from the user (client) devices 240. The virtual applications 228 created by tenants are typically constructed in accordance with the tenant-specific metadata 238, which describes the particular tables, reports, interfaces and/or other features of the particular application. In various embodiments, each virtual application 228 generates dynamic web content (including GUIs, detail views, secondary or sidebar views, and the like) that can be served to a browser or other client program 242 associated with its user device 240, as appropriate.

The runtime application generator 220 suitably interacts with the query generator 214 to efficiently obtain multi-tenant data 232 from the database 230 as needed. In a typical embodiment, the query generator 214 considers the identity of the user requesting a particular function, and then builds and executes queries to the database 230 using system-wide metadata 236, tenant specific metadata 238, pivot tables 234, and/or any other available resources. The query generator 214 in this example therefore maintains security of the common database 230 by ensuring that queries are consistent with access privileges granted to the user that initiated the request.

The data processing engine 212 performs bulk processing operations on the data 232 such as uploads or downloads, updates, online transaction processing, and/or the like. In many embodiments, less urgent bulk processing of the data 232 can be scheduled to occur as processing resources become available, thereby giving priority to more urgent data processing by the query generator 214, the search engine 216, the virtual applications 228, etc. In certain embodiments, the data processing engine 212 and the processor 205 cooperate in an appropriate manner to perform and manage various techniques, processes, and methods associated with email processing, as described in more detail below.

In operation, developers use the application platform 210 to create data-driven virtual applications 228 for the tenants that they support. Such virtual applications 228 may make use of interface features such as tenant-specific screens 224, universal screens 222 or the like. Any number of tenant-specific and/or universal objects 226 may also be available for integration into tenant-developed virtual applications 228. The data 232 associated with each virtual application 228 is provided to the database 230, as appropriate, and stored until it is requested or is otherwise needed, along with the metadata 238 that describes the particular features (e.g., reports, tables, functions, etc.) of that particular tenant-specific virtual application 228. For example, a virtual application 228 may include a number of objects 226 accessible to a tenant, wherein for each object 226 accessible to the tenant, information pertaining to its object type along with values for various fields associated with that respective object type are maintained as metadata 238 in the database 230. In this regard, the object type defines the structure (e.g., the formatting, functions and other constructs) of each respective object 226 and the various fields associated therewith. In an exemplary embodiment, each object type includes one or more fields for indicating the relationship of a respective object of that object type to one or more objects of a different object type (e.g., master-detail, lookup relationships, or the like).

In exemplary embodiments, the application platform 210, the data processing engine 212, the query generator 214, and the processor 205 cooperate in an appropriate manner to process data associated with a hosted virtual application 228 (such as a customer relationship management application), generate and provide suitable GUIs (such as web pages) for presenting data on client devices 240, and perform additional techniques, processes, and methods to support the features and functions for the hosted virtual application 228.

Still referring to FIG. 2, the data and services provided by the server 202 can be retrieved using any sort of personal computer, mobile telephone, portable device, tablet computer, or other network-enabled user device 240 that communicates via the network 245. Typically, the user operates a conventional browser or other client program 242 to contact the server 202 via the network 245 using, for example, the hypertext transport protocol (HTTP) or the like. The user typically authenticates his or her identity to the server 202 to obtain a session identifier ("SessionID") that identifies the user in subsequent communications with the server 202. When the identified user requests access to a virtual application 228, the runtime application generator 220 suitably creates the application at run time based upon the metadata 238, as appropriate. The query generator 214 suitably obtains the requested data 232 from the database 230 as needed to populate the tables, reports or other features of the particular virtual application 228. As noted above, the virtual application 228 may contain Java, ActiveX, or other content that can be presented using conventional client software running on the user device 240; other embodiments may simply provide dynamic web or other content that can be presented and viewed by the user, as desired.

Figure 3:
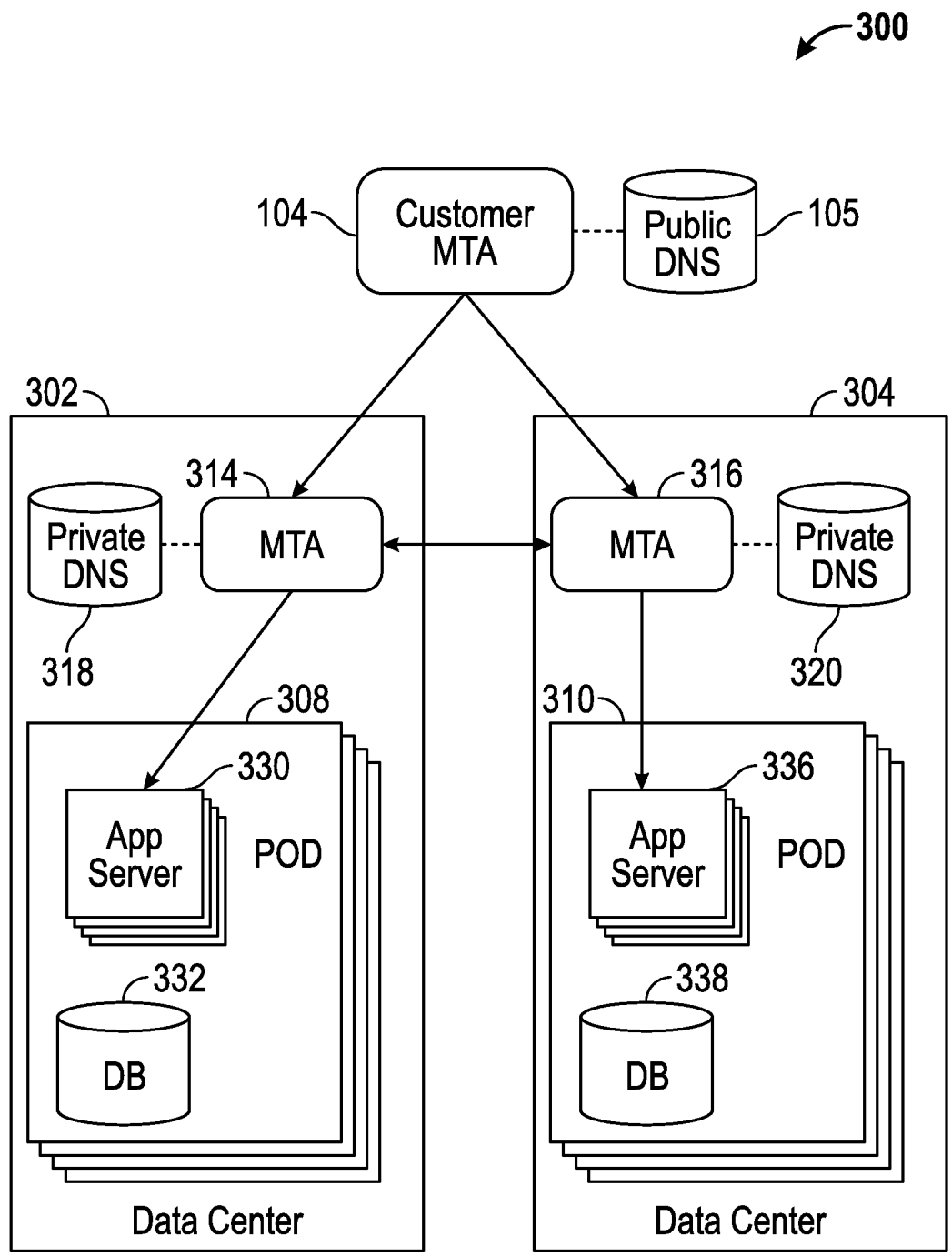
FIG. 3 is a schematic representation of two data centers, which may be deployed in an embodiment of a multi-tenant database system.

In general, the server 202 and the multi-tenant database 230 depicted in FIG. 2 may correspond to a single instance or pod of the system core. In other words, the arrangement and functionality of the server 202 and the multi-tenant database 230 can be duplicated as needed to realize any number of instances, which in turn may be distributed across any number of data centers 106 (see FIG. 1). For example, FIG. 3 depicts two data centers 302, 304 of a multi-tenant database system 300, and each data center 302, 304 includes four pods. FIG. 3 also depicts one customer MTA 104 and the public DNS database 105 (see FIG. 1).

The following description assumes that the customer MTA 104 intends to send an email to a user of one of the tenants maintained by the multi-tenant database system 300. In accordance with well-known email delivery principles, the customer MTA 104 consults the public DNS database 105 to determine where to send the outgoing email message. In accordance with certain implementations, the public DNS database 105 provides a network address (e.g., an IP address) that corresponds to a local MTA that resides at one of the data centers 302, 304. In this regard, FIG. 3 shows a local MTA 314 corresponding to the data center 302, and another local MTA 316 corresponding to the data center 304. Although each data center 302, 304 is shown with a single MTA block, an embodiment may utilize a plurality of MTAs to support load variations, redundancy, failsafe operations, and the like. FIG. 3 shows only one local MTA 314 and only one local MTA 316 for the sake of clarity and simplicity. The local MTA 314 cooperates with a private DNS database 318 associated with the data center 302, and the local MTA 316 cooperates with a private DNS database 320 associated with the data center 304. The private DNS databases 318, 320 contain the same data and, conceptually, they represent two views of the same data set.

The data center 302 includes four pods 308 (only one is shown in detail), and the data center 304 includes four pods 310 (only one is shown in detail). Each pod 308 may include any number of application servers 330 and a respective multi-tenant database 332. Likewise, each pod 310 may include any number of application servers 336 and a respective multi-tenant database 338. Each pod may also include other components, modules, or features (not shown) that may provide additional functionality that is not particularly relevant to the email re-routing methodology presented here. For the embodiments presented here, a user of the multi-tenant database system 300 is associated with a tenant, which in turn is associated with only one pod, which in turn is associated with only one data center. Consequently, the multi-tenant database system 300 must be able to correctly route an incoming email to the correct pod within the correct data center. For example, if the customer MTA 104 has an email intended for a user of an organization that is provided by a pod 308 in the data center 302, then the public DNS database 105 should properly identify the IP address of the local MTA 314 to enable the customer MTA 104 to route the email to the local MTA 314. Thereafter, the local MTA 314 consults the private DNS database 318, which in turn should properly identify the particular destination pod within the data center 302. Thus, the private DNS database 318 allows the local MTA 314 to correctly route incoming email to the various pods 308 that are resident at the data center 302. It should be apparent that each local MTA is responsible for handling email messages (both incoming and outgoing) for all of the pods in its respective data center.

Incoming Email Processing with No Re-Routing

This section of the description summarizes the handling of an incoming email in accordance with an expected routing scheme. In certain embodiments, users, features, functions, or objects of the multi-tenant database system will be assigned email addresses that include pod-identifying information. For example, the domain of an incoming email address may include a pod token that uniquely identifies the pod to which the email recipient is assigned. Thus, when a new email address is created for a tenant, the domain string (the characters that follow the @ symbol) will include a pod token that identifies the particular pod in the multi-tenant database system that services that tenant. In this regard, assume that a new email address is created for:

service1@x----x.pod1.example.com where "x----x" may be any desired string of characters (or no characters if so desired). The domain string includes "pod1" as the pod token. Accordingly, this new email address is associated with a tenant of the multi-tenant database system that resides at Pod 1 at the time of creation. It should be appreciated that email addresses formatted in this manner may be subjected to translations, transformations, or encoding techniques such that shorter or simplified email addresses are visible to end users. For example, a customer may have a simple email such as support@company.com, which is translated by a customer MTA 104 (see FIG. 3) into a more complicated email address that includes the pod token, perhaps in the header data. In an email "reply" scenario, the complex email address may actually appear.

The new email address is published upon creation, and the public DNS database is updated with an entry that allows the customer MTA 104 to correctly route email to the local MTA that services the original pod (Pod 1 in this example). When an incoming email reaches the correct local MTA, the private DNS database is consulted to determine where to internally route the incoming email. In other words, the private DNS database provides the routing destination (of Pod 1 in this example) to the local MTA, which then routes the incoming email as needed.

In certain embodiments, the private DNS database provides a destination IP address corresponding to an incoming email address. The private DNS database, although maintained, updated, and controlled by the administrator of the multi-tenant database system, is universal in that any and all of the private MTAs (regardless of data center) looking up a given email address will obtain the same destination IP address. Thus, a local MTA in a data center located in San Jose, Calif. and a local MTA in a data center located in Chicago, Ill. processing the same incoming email address will both receive the same destination IP address from their respective private DNS databases. However, due to certain practical restrictions and settings, a local MTA resident at a particular data center can route incoming email to an IP address of a pod if and only if that IP address is local to the particular data center. Thus, the local MTA resident in the San Jose data center can route incoming email to IP addresses that point to pods that are local/internal to the San Jose data center. In contrast, the local MTA resident in the San Jose data center is unable to route incoming email to IP addresses that point to pod destinations that are local/internal to the Chicago data center. Thus, even if the local MTA in San Jose knows that a destination IP address points to a pod in the Chicago data center, the local MTA in San Jose is unable to re-route the email to the Chicago data center.

The Need for Re-Routing

As explained above, email addresses supported by the multi-tenant database system include pod-identifying tokens (or any suitable identifying data). By the time an incoming email reaches the multi-tenant database system, the email address is already in the appropriate format to enable routing based on the pod token. If, however, an organization is "moved" from its current pod (Pod 1, for example) to another pod (Pod 2, for example) or to another data center, incoming email that includes the "pod1" token will be incorrectly routed. Notably, movement of an organization from one pod to another, or movement of a pod from one data center to another data center, may be executed by the provider of the multi-tenant database system in a manner that is transparent to the end users. Moreover, such movement may be executed without requiring any changes or modifications to existing email addresses, which have already been published and recorded in the public DNS database 105. Consequently, movement of organizations or pods can result in email addresses having published DNS information that is outdated and incorrect. Accordingly, if an organization is moved and nothing else is changed, incoming email messages to recipients of the moved organization will be routed to the previous pod rather than to the new pod where the organization is currently located. If an organization is moved to a new data center, then the previously published DNS information will cause incoming email messages to be routed to the old data center rather than the correct new data center.

Email Re-Routing Scheme

The re-routing methodology presented herein addresses the problem outlined above, namely, how to correctly direct incoming email to a pod of a multi-tenant database system after an organization has moved from one pod to another or from one data center to another. The resolution is not trivial due to certain requirements and restrictions of the particular embodiment of the multi-tenant database system. For example, at the application server level within the pods, the multi-tenant database system is very intelligent. However, the processing intelligence is reduced for components and layers that appear higher in the system architecture. Thus, the local MTAs are less intelligent than the application servers, and the customer MTAs rely on the public DNS database to route email to one of the local MTAs. At this high public level, there is very little intelligence: the public DNS database is a simple lookup table and directory. Thus, even though incoming email eventually needs to be to be routed to a very low level application server at the individual pod level, the decision making logic and hierarchy responsible for routing email involves progressively dumber machines. As explained in more detail below, the re-routing methodology ports at least some of the re-directing functionality to the higher levels of the multi-tenant database system in a way that does not require a high level of processing intelligence.

Figure 4:
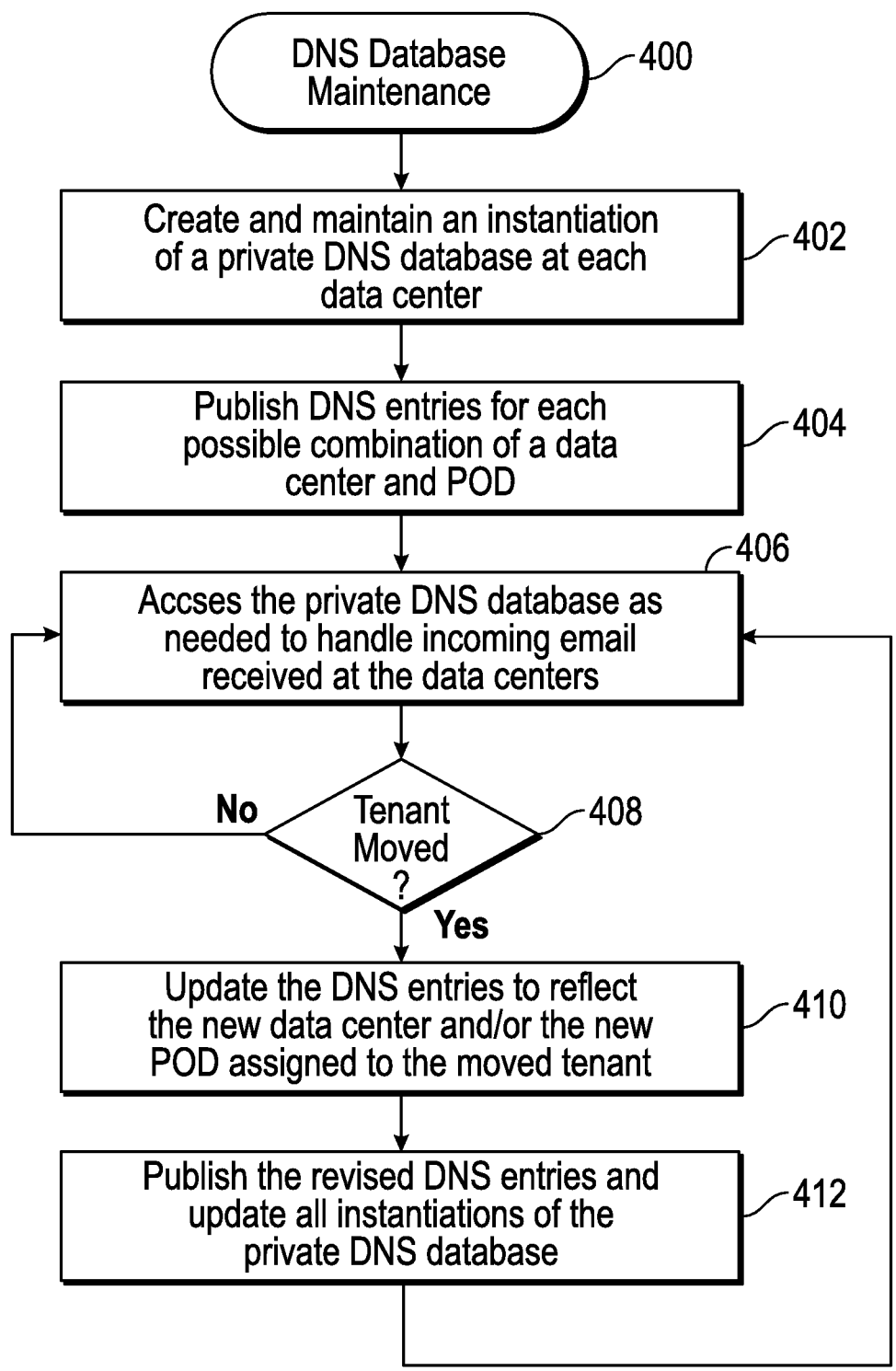
FIG. 4 is a flow chart that illustrates an exemplary embodiment of a DNS database maintenance process.

The email re-routing scheme presented here does not require any modifications or updates to the public DNS database 105 or to the customer MTAs 104 (see FIG. 1 and FIG. 3). Rather, the private DNS databases that remain under the control of the multi-tenant database system administrators are maintained and updated as needed to reflect movement of tenants within the multi-tenant database system. In this regard, FIG. 4 is a flow chart that illustrates an exemplary embodiment of a DNS database maintenance process 400, which may be performed by the multi-tenant database system or any portion or component thereof.

The process 400 may begin by creating and maintaining an instantiation of a private DNS database at each data center of the multi-tenant database system (task 402). In certain embodiments of the system, the private DNS database is universal in that the same DNS entries are redundantly provided in each instantiation of the private DNS database. Thus, each data center in the system has its own version of the private DNS database that can be accessed by the local MTA implemented at the data center. In accordance with the illustrated embodiment of the process 400, the DNS entries are published such that all of the private DNS databases are initially populated (task 404). Notably, the private DNS database includes a respective DNS entry for each and every possible combination of one data center and one instance (pod) of the multi-tenant database system core. For example, assume that the multi-tenant database system includes three data centers, and that each data center has four pods (for a total of twelve different pods). The private DNS database will include 36 entries corresponding to the following possible combinations:

TABLE 1

| Private DNS Database Combinations | | | | | |
|---|---|---|---|---|---|
| POD1 + DC1 | POD3 + DC1 | POD5 + DC1 | POD7 + DC1 | POD9 + DC1 | POD11 + DC1 |
| POD1 + DC2 | POD3 + DC2 | POD5 + DC2 | POD7 + DC2 | POD9 + DC2 | POD11 + DC2 |
| POD1 + DC3 | POD3 + DC3 | POD5 + DC3 | POD7 + DC3 | POD9 + DC3 | POD11 + DC3 |
| POD2 + DC1 | POD4 + DC1 | POD6 + DC1 | POD8 + DC1 | POD10 + DC1 | POD12 + DC1 |
| POD2 + DC2 | POD4 + DC2 | POD6 + DC2 | POD8 + DC2 | POD10 + DC2 | POD12 + DC2 |
| POD2 + DC3 | POD4 + DC3 | POD6 + DC3 | POD8 + DC3 | POD10 + DC3 | POD12 + DC3 |

Although not shown above, each unique combination (DNS entry) also includes an identifier, pointer, or other data that corresponds to a destination location, a destination address, or the like. In accordance with the exemplary embodiments described here, each DNS entry includes a destination internet protocol (IP) address that is used for purposes of re-routing incoming email within the multi-tenant database system. The relevance and significance of the destination IP addresses will become apparent from the following description. Briefly, the various instantiations of the private DNS database are accessed and searched as needed to handle incoming email received at the different data centers of the multi-tenant database system (task 406). More specifically, the local MTAs resident at the data centers receive the incoming email and consult the private DNS databases to determine how best to re-route the incoming email.

If a tenant of the multi-tenant database system is moved from one data center to another data center that is different than the previous data center (the "Yes" branch of query task 408), then the process 400 updates the DNS entries to reflect the newly assigned data center and/or to reflect the newly assigned pod of the moved tenant (task 410). The revised DNS entries are published to update all of the instantiations of the private DNS database (task 412) such that the private DNS database correctly points to the new data center and pod combination of the moved tenant. The embodiments described here are suitably configured to handle and compensate for the movement of tenants across different data centers. Although not always necessary, the process 400 could also update the private DNS database when a tenant moves from one pod to another pod within the same data center. Internal movement within the same data center need not require an update to the private DNS entries if such movement can be tracked and managed at the pod level and/or at the application server level (see FIG. 3).

Figure 5:
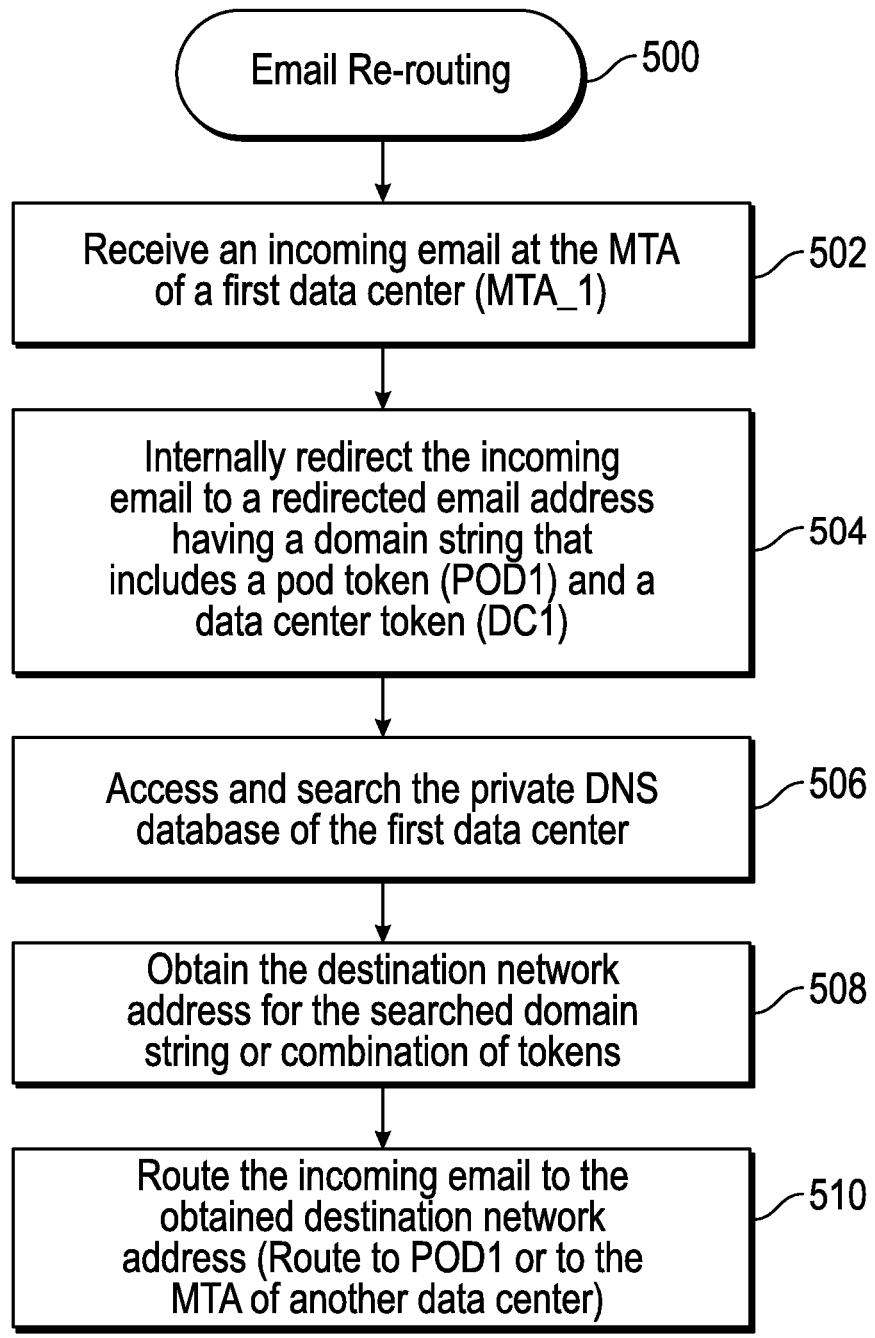
FIG. 5 is a flow chart that illustrates an exemplary embodiment of an email re-routing process.

FIG. 5 is a flow chart that illustrates an exemplary embodiment of an email re-routing process 500, which may be performed by a multi-tenant database system, a subsystem thereof, a component thereof, or the like. In certain implementations, the process 500 is performed by a data center of the multi-tenant database system. More specifically, the process 500 may be performed by the local MTA that is resident at the data center (see FIG. 3). Accordingly, the process 500 represents one exemplary embodiment of a method for processing email in a multi-tenant database system.

The process 500 assumes that all instantiations of the private DNS database are current and accurate, as explained above with reference to the process 400. In practice, therefore, the process 400 and the process 500 could be performed in parallel if needed. The process 500 may begin by receiving an incoming email at a first data center of the multi-tenant database system (task 502). For this particular embodiment, the incoming email is received by the local MTA that resides at the first data center. The incoming email (as received) is directed to an incoming email address having a domain string that includes a pod token. The pod token may be realized as any string of characters that can be recognized and processed by the system. In certain embodiments, the pod token is formatted as a subdomain of the domain string of the incoming email address. For the example outlined here, the incoming email is directed to the following email address: service1@pod1.example.com. For this example, the domain string is "pod1.example.com" and the pod token is "pod1" (which appears as a subdomain of the incoming email address). It should be appreciated that a pod token may be relatively simple, relatively complex, identify only one subdomain, span a plurality of subdomains, have any number of characters, or the like. Moreover, a pod token could be hidden from normal view, encoded, or the like.

A pod token serves as an identifier of an instance of the multi-tenant database system core. In practice, therefore, the incoming email (as received) may be erroneously directed to the pod identified by the pod token, or it may be accurately directed to the pod identified by the pod token. Erroneous email routing may result from tenant movement within the multi-tenant database system that occurs after the incoming email address has been published and reflected in the public DNS database 105 (see FIG. 1 and FIG. 3). In such a scenario, the tenant to which the incoming email is directed may no longer reside at the pod identified by the pod token conveyed in the incoming email address. Consequently, it may be difficult or impossible for the local MTA that receives and processes the incoming email to successfully deliver the email.

The process 500 contemplates the possibility of erroneously routed email by internally redirecting the incoming email to a redirected email address (task 504). The redirected email address has a domain string that includes the originally received pod token (pod1 for this example) and a data center token that identifies the data center that received the incoming email (the first data center for this example). The data center token may be realized as any string of characters that can be recognized and processed by the system. In certain embodiments, the data center token is formatted as a subdomain of the domain string of the redirected email address. For the example presented here, the redirected email address is formatted as follows: service1@pod1.dc1.example.com. Note that the original pod token "pod1" is retained as one subdomain of the redirected email address. For this example, the domain string of the redirected email is "pod1.dc1.example.com" and the data center token is "dc1" (which appears as another subdomain of the redirected email address). It should be appreciated that a data center token may be relatively simple, relatively complex, identify only one subdomain, span a plurality of subdomains, have any number of characters, or the like. Moreover, a data center token could be hidden from normal view, encoded, or the like.

A data center token serves as an identifier of one of the data centers in the multi-tenant database system. More specifically, the data center token that appears in the redirected email address identifies the data center that received the incoming email. Conceptually, the redirection performed during task 504 inserts the data center token of the data center into the domain string of the incoming email to create a new email address. Notably, this email address transformation is performed for all incoming email, regardless of whether the incoming email has been properly routed to the correct destination data center or erroneously directed to the data center.

Next, the process 500 may access and search the private DNS database that is local to the data center that received the incoming email (task 506). In particular, the local instantiation of the private DNS database is searched against the domain string (or the tokens contained in the domain string) of the redirected email address in an attempt to find and identify a DNS entry that includes the specific combination of the pod token and the data center token. In this regard, the local MTA is suitably configured to process the redirected email address to initiate and execute the searching. As mentioned above with reference to Table 1, the private DNS database is maintained and updated such that it contains an entry for each possible combination of data center and pod. One of the entries in the private DNS database will be the entry for the "correct" combination, i.e., the entry that points to the actual data center where the pod that services the incoming email is located. In this regard, the correct entry resolves to the network address of the pod (instance) for the incoming email. In contrast, the entries for all incorrect combinations resolve to the network address of the local MTA for the correct data center.

The following non-limiting example illustrates the DNS entries for a simple implementation having three data centers (identified by data center tokens dc1, dc2, and dc3), wherein a first instance of the multi-tenant database system core (identified by pod token pod1) is implemented in the first data center and a second instance (identified by pod token pod2) is implemented in the second data center. For this simplified example, the private DNS database will include the following relevant entries:

TABLE 2

Private DNS Database Entries

| Redirected Email Domain String | Destination IP Address |
| --- | --- |
| pod1.dc1.example.com | Pod 1 |
| pod1.dc2.example.com | Local MTA in Data Center 1 |
| pod1.dc3.example.com | Local MTA in Data Center 1 |
| pod2.dc1.example.com | Local MTA in Data Center 2 |
| pod2.dc2.example.com | Pod 2 |
| pod2.dc3.example.com | Local MTA in Data Center 2 |

The process 500 searches the private DNS database to find the entry that "matches" the domain string of the redirected email address. After locating the matching DNS entry, the process obtains a destination location or destination network address corresponding to the searched domain string or corresponding to the combination of tokens that appear in the searched domain string (task 508). In other words, the process 500 obtains a destination identifier for the redirected email address for purposes of re-routing the incoming email. The destination identifier (e.g., an IP address) is obtained from the respective DNS entry that includes the unique combination of the pod token and the data center token. Thereafter, the process 500 routes the incoming email to the obtained destination network address (task 510). For this particular implementation, task 510 routes the incoming email to the pod identified by the pod token, or to the local MTA of a different data center.

Referring to the above example, if the redirected email address includes "pod1" as the pod token and "dc1" as the data center token, then a search of the private DNS database will return the IP address of Pod 1 as the destination address for the incoming email. This example corresponds to the scenario where the incoming email is correctly routed to Pod 1 at the outset. Accordingly, the incoming email need not be re-routed to a different data center. Rather, the incoming email is internally routed to Pod 1 for handling as usual. Similarly, if the redirected email address includes "pod2" as the pod token and "dc2" as the data center token, then a search of the private DNS database will return the IP address of Pod 2 as the destination address for the incoming email.

In contrast, if the redirected email address includes "pod1" as the pod token and "dc2" as the data center token, then a search of the private DNS database will return the IP address of the local MTA in the first data center. This scenario occurs when the incoming email is initially received at the second data center (which causes the data center token "dc2" to appear in the redirected email domain string) even though the email recipient is actually serviced by Pod 1, which is located in the first data center. Accordingly, the relevant DNS entry causes the incoming email to be re-routed from the second data center (which received the incoming email) to the first data center. More specifically, the incoming email is re-routed to the local MTA of the first data center.

Thus, the destination network address corresponds to a network address of the originally designated pod when the incoming email address is an email address that is currently maintained by a tenant implemented by the originally designated pod. On the other hand, the destination network address may correspond to a network address of a different data center (more specifically, to a network address of a local MTA resident at a different data center) when the incoming email address is an email address that is not currently maintained by a tenant implemented by the originally designated pod.

It should be appreciated that the process 500 may be repeated any number of times at different data centers as needed to handle once-redirected email, twice-redirected email, and so on. In this regard, a local MTA of a data center may receive a redirected email having a domain string that already includes a pod token and a data center token. In accordance with the exemplary methodology described above, any redirected email received at a data center will include in its domain string the data center token that identifies the previous data center (i.e., the data center from which the redirected email was sent). The received data center token, however, is replaced with the data center token that identifies the new data center, as described above with reference to task 504. If the DNS entries are correct and accurate (as described above), then at most only one redirect can occur. This is due to the exemplary methodology outlined above, where by definition the destination associated with an incorrect combination is the data center where the combination of "pod+data center" is actually correct. That said, in alternative embodiments the redirecting mechanism and re-routing scheme could be repeated any number of times until the correct combination of pod token and data center token is obtained (or until the system times out). For example, if something in the network or system policy prevents Data Center 3 from directly communicating with Data Center 1, then the DNS databases could be configured such that "pod1.dc3" routes to Data Center 2. At that point, the MTA resident at Data Center 2 determines that "pod1.dc2" routes to Data Center 1. This and other scenarios could be addressed by the techniques and methodologies presented herein.

In certain situations, an incoming email arrives at the correct data center, but includes the wrong pod token (i.e., the tenant that services the incoming email address has moved from one pod to another pod within the same data center). In such situations, it may be possible to internally redirect the incoming email using the native intelligence and processing logic of the pods, such as the application servers resident at the pod level. In this regard, the local MTA may carry out an exchange with the destination pod before actually attempting to route the incoming email to the IP address of the destination pod. More specifically, the local MTA can notify the destination pod that an incoming email is pending. In response to this notification, an application server of the destination pod informs the local MTA that the tenant has moved to a different pod (of the same data center), and the application server instructs the local MTA to deliver the incoming email to a redirected email address that points to the correct pod. To support this methodology, the application server must be provided with the intelligence and knowledge of the whereabouts of the tenants/organizations within the pods, because that information is not available in the DNS databases. This approach may be desirable to reduce the amount of private DNS database updates that are needed to support the email re-routing techniques presented here.

The various tasks performed in connection with any process described above may be performed by software, hardware, firmware, or any combination thereof. In practice, portions of a process presented herein may be performed by different elements of the described system, e.g., an MTA, an application server, a data center, a pod, or the like. It should be appreciated that a process described herein may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in a figure could be omitted from an embodiment of the illustrated process as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible, non-transitory, processor-readable medium in certain embodiments. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for processing email for a database system comprising a plurality of data centers and a plurality of instances of a database system core, each of the plurality of data centers implementing at least one of the plurality of instances of the database core, the method comprising:
   receiving an incoming email at a first local mail transfer agent (MTA) of a first data center of the plurality of data centers, the incoming email erroneously directed to a first instance of the plurality of instances of the database system core, where the incoming email is directed to an incoming email address comprising a first domain string that includes a pod token serving as the identifier of the first instance;
   searching a private domain name service (DNS) database maintained at the first data center, based on an identifier of the first instance and an identifier of the first data center, the private DNS database comprising a respective DNS entry for every possible combination of one of the plurality of data centers and one of the instances of the database system core;
   obtaining, based on the searching, an identifier associated with a second data center of the plurality of data centers, where the identifier associated with the second data center comprises a second domain string that includes the pod token and a data center token serving as the identifier of the first data center; and
   routing the incoming email in accordance with the identifier of the second data center.

2. The method of claim 1, further comprising:
   obtaining a network address of a second local MTA implemented at the second data center; and
   routing the incoming email to the second local MTA.

3. The method of claim 1, wherein:
the incoming email is directed to an incoming email address comprising a first domain string that includes a pod token serving as the identifier of the first instance;
the method further comprises redirecting the incoming email to a redirected email address comprising a second domain string that includes the pod token and a data center token serving as the identifier of the first data center; and
the first local MTA processes the redirected email address to initiate the searching.

4. The method of claim 3, wherein:
the incoming email is a once-redirected email;
the first domain string includes the pod token and a third data center token that identifies a third data center of the plurality of data centers; and
the redirecting replaces the third data center token with the first data center token.

5. A non-transitory computer-readable medium having computer-executable instructions configurable to cause a processor to perform a method of processing email for a database system having a plurality of data centers and a plurality of instances of a database system core, each of the plurality of data centers implementing at least one of the plurality of instances, the method comprising:
receiving an incoming email at a first local mail transfer agent (MTA) of a first data center of the plurality of data centers, the incoming email erroneously directed to a first instance of the plurality of instances of the database system core, where the incoming email is directed to an incoming email address comprising a first domain string that includes a pod token serving as the identifier of the first instance;
searching a private domain name service (DNS) database maintained at the first data center, based on an identifier of the first instance and an identifier of the first data center, the private DNS database comprising a respective DNS entry for every possible combination of one of the plurality of data centers and one of the instances of the database system core;
obtaining, based on the searching, an identifier associated with a second data center of the plurality of data centers, where the identifier associated with the second data center comprises a second domain string that includes the pod token and a data center token serving as the identifier of the first data center; and
routing the incoming email in accordance with the identifier of the second data center.

6. The computer-readable medium of claim 5, further comprising:
obtaining a network address of a second local MTA implemented at the second data center; and
routing the incoming email to the second local MTA.

7. The computer-readable medium of claim 5, wherein:
the incoming email is directed to an incoming email address comprising a first domain string that includes a pod token serving as the identifier of the first instance;
the method further comprises redirecting the incoming email to a redirected email address comprising a second domain string that includes the pod token and a data center token serving as the identifier of the first data center; and
the first local MTA processes the redirected email address to initiate the searching.

8. The computer-readable medium of claim 7, wherein:
the incoming email is a once-redirected email;
the first domain string includes the pod token and a third data center token that identifies a third data center of the plurality of data centers; and
the redirecting replaces the third data center token with the first data center token.

* * * * *